(12) United States Patent
Chen et al.

(10) Patent No.: US 12,203,845 B2
(45) Date of Patent: Jan. 21, 2025

(54) OPTICAL IMAGING SYSTEM AND METHOD BASED ON RANDOM LIGHT FIELD SPATIAL STRUCTURE ENGINEERING

(71) Applicant: SOOCHOW UNIVERSITY, Suzhou (CN)

(72) Inventors: Yahong Chen, Suzhou (CN); Deming Peng, Suzhou (CN); Yonglei Liu, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 299 days.

(21) Appl. No.: 17/797,685

(22) PCT Filed: Jun. 21, 2021

(86) PCT No.: PCT/CN2021/101132
§ 371 (c)(1),
(2) Date: Aug. 4, 2022

(87) PCT Pub. No.: WO2022/257174
PCT Pub. Date: Dec. 15, 2022

(65) Prior Publication Data
US 2023/0314309 A1 Oct. 5, 2023

(30) Foreign Application Priority Data
Jun. 7, 2021 (CN) .......................... 202110629377.3

(51) Int. Cl.
*G01N 21/21* (2006.01)
*G01B 11/00* (2006.01)
(Continued)

(52) U.S. Cl.
CPC ......... *G01N 21/21* (2013.01); *G01N 21/4795* (2013.01); *G02B 27/00* (2013.01);
(Continued)

(58) Field of Classification Search
CPC ............... G01N 21/21; G01N 21/4795; G01N 2021/479; G02B 27/00; G02B 27/283; G02B 30/10; G01B 11/00; G01B 11/24
(Continued)

(56) References Cited

U.S. PATENT DOCUMENTS 5,491,552 A * 2/1996 Knuttel ............... G01N 21/4795
356/512
6,201,608 B1 * 3/2001 Mandella ............... A61B 3/102
356/73.1
(Continued)

FOREIGN PATENT DOCUMENTS

CN 101710828 A 5/2010
CN 102221342 A 10/2011
(Continued)

OTHER PUBLICATIONS

Li Chen, Ziyang Chen, Rakesh Kumar Singh, and Jixiong Pu, "Imaging of polarimetric-phase object through scattering medium by phase shifting," Opt. Express 28, 8145-8155 (2020) (Year: 2020).*

*Primary Examiner* — Mohamed K Amara
*Assistant Examiner* — Noah J. Haney
(74) *Attorney, Agent, or Firm* — SZDC Law PC

(57) ABSTRACT

An optical imaging system and a method based on spatial structure engineering of random light are disclosed. The method includes performing scattering processing on transmitted light to obtain a to-be-measured light; splitting polarization of the to-be-measured light. One light is split into x-polarized and y-polarized beams, and the other one is firstly combined with a reference beam and then split into x-polarized and y-polarized beams; measuring the intensity distributions of x-polarized and y-polarized parts of the to-be-measured light, the combined light, and the reference light; obtaining a real part and an imaginary part of the cross (Continued)

spectral density of the to-be-measured light, retrieving the intensity distribution of the light on the scattering medium and calculating the intensity to obtain the shape and location of the object to be measured.

10 Claims, 2 Drawing Sheets

(51) Int. Cl.
    *G01B 11/24* (2006.01)
    *G01N 21/47* (2006.01)
    *G02B 27/00* (2006.01)
    *G02B 27/28* (2006.01)
    *G02B 30/10* (2020.01)

(52) U.S. Cl.
    CPC ........... *G02B 27/283* (2013.01); *G02B 30/10* (2020.01); *G01B 11/00* (2013.01); *G01B 11/24* (2013.01); *G01N 2021/479* (2013.01)

(58) Field of Classification Search
    USPC .......................................... 356/364
    See application file for complete search history.

(56) References Cited

U.S. PATENT DOCUMENTS

| | | | |
|---|---|---|---|
| 2006/0072118 A1* | 4/2006 | Chan .................. | A61B 5/14546 |
| | | | 356/495 |
| 2009/0086216 A1* | 4/2009 | Marks ................ | G01B 9/02004 |
| | | | 359/370 |
| 2009/0153876 A1 | 6/2009 | Chan et al. | |
| 2023/0080237 A1* | 3/2023 | Mehta .................... | G02B 21/16 |
| | | | 250/252.1 |

FOREIGN PATENT DOCUMENTS

| | | | | |
|---|---|---|---|---|
| CN | 103344198 A | 10/2013 | | |
| CN | 110274877 A | 9/2019 | | |
| CN | 112804060 A * | 5/2021 | ........... | H04L 9/0869 |
| WO | WO-2008151155 A2 * | 12/2008 | ......... | A61B 1/00096 |

* cited by examiner

OPTICAL IMAGING SYSTEM AND METHOD BASED ON RANDOM LIGHT FIELD SPATIAL STRUCTURE ENGINEERING This application is the National Stage Application of PCT/CN2021/101132, filed on Jun. 21, 2021, which claims priority to Chinese Patent Application No. 202110629377.3, filed on Jun. 7, 2021, which is incorporated by reference for all purposes as if fully set forth herein.

FIELD OF THE INVENTION

The present invention relates to the technical field of optics, and more particularly to an optical imaging method and system based on random light field spatial structure engineering.

DESCRIPTION OF THE RELATED ART

With the gradual development of techniques of imaging through scattering medium, many breakthroughs have been made. At present, the commonly used approach to imaging through weakly scattering medium is by suppressing scattered light and extracting ballistic light transmitted through the scattering medium. The techniques utilized mainly include adaptive optical imaging technique, optical coherence tomography technique, multi-photon microscopy and multi-spectral photoacoustic tomography etc. The development and application of these techniques have solved the problems in astronomical imaging, underwater detection, and biological imaging. With the continued in-depth study of scattering mechanism, scattering imaging technique at present no longer focuses on the separation of scattered light to extract ballistic light, but rather on utilization of scattered light. Through a thorough study of the characteristics of scattered light, a qualitative leap has been accomplished from incapability of recovering the object hidden behind the strong scattering layer to capability of recovering the object behind the scattering layer. Particularly, the technique of imaging through scattering medium is not only widely applied in microscopic imaging and super-resolution imaging, but also plays an important role in the fields of optical fiber imaging, holographic imaging and optical communication etc.

At present, methods of imaging through scattering medium mainly include wavefront shaping technique and scattering imaging technique based on optical memory effect. Among them, wavefront shaping technique includes three aspects: optical phase conjugation, wavefront shaping technique based on feedback optimization and optical transmission matrix technique. Scattering imaging technique based on optical memory effect includes two aspects: speckle correlation imaging technique and point spread function engineering imaging technique.

The focus of wavefront shaping technique is to study the propagation characteristics of light in a scattering medium, and to express the characteristics of the scattering medium quantitatively or qualitatively in a mathematical form, which is the basis for utilization of scattering effect. However, the method relying on wavefront shaping technique for imaging through a scattering medium has shortcomings, such as low energy utilization, complicated and time-consuming process, and inadequate real-time performance, so it is impossible to observe the object hidden behind the scattering medium in real time.

The essence of scattering imaging technique based on optical memory effect is to make full use of speckle energy and speckle distribution characteristics for imaging through a scattering medium. With respect to the speckle correlation imaging technique, some scholars have proposed a non-invasive method of imaging through a scattering layer. When the target size is within the range of optical memory effect, an optical camera is used to record the speckle behind the scattering medium, that is, the light intensity information. The whole optical system is regarded as an incoherent system with a space translation invariant point spread function (PSF), and then the speckle can be written in the form of convolution of the target information and the point spread function of the system. The Fourier amplitude information of the target object hidden behind the scattering medium can be obtained through autocorrelation operation of light intensity, and then reconstruction of the target can be realized by combination with the effective phase retrieval algorithm. Compared with the wavefront shaping technique, this method obviates the need to measure the priori information of the scattering imaging system, in other words, it does not need a reference light path to assist in imaging or to implant a light source behind or inside the scattering medium. However, the imaging range of the target size is limited by the optical memory effect, so that it is impossible to image large-size objects. In addition, with respect to the spread function engineering imaging technique, some scholars proposed that, by measuring the point spread function of the system and by using Lucy-Richardson deconvolution iterative nonlinear retrieval method, imaging through scattering medium is accomplished. Some scholars have further proposed a speckle imaging method that utilizes phase diversity as applied in astronomical imaging. By obtaining the speckle information of various image planes, the point spread function of the whole optical scattering system can be jointly estimated and obtained without reference, and then imaging through scattering medium can be realized through deconvolution technique. However, the point spread function engineering imaging technique needs to obtain the point spread function of the system in advance, and its imaging effect depends on the accuracy of the obtained point spread function of the system. In the imaging process, the stability of scattering medium should be ensured, and this method is only applicable to static scattering medium imaging.

To sum up, there is an urgent need for an imaging system and method that can image dynamic objects quickly, and in which the imaging range is not limited by the optical memory effect and the point spread function of the whole optical system does not need to be measured.

SUMMARY OF THE INVENTION

In view of this, a technical problem to be solved by the present invention is to overcome the shortcomings of prior art that imaging efficiency of dynamic objects is low, the imaging range is limited by the optical memory effect and the point spread function of the whole optical system needs to be measured.

To address the technical problem mentioned above, the present invention provides an optical imaging system based on random light field spatial structure engineering, including:

a scattering assembly configured to scatter a beam transmitted through free space via a scattering medium to obtain light to be measured, the beam carrying information on an object to be measured;

a first beam polarization splitting assembly configured to split the polarization of the light to be measured, in which one light beam to be measured is split into x-polarized light and y-polarized light and the other light beam to be measured is combined with a reference light beam and then split into x-polarized light and y-polarized light, the reference light being light that is completely coherent with the light to be measured;

an optical measurement assembly configured to measure intensity distribution of the x-polarized light and y-polarized light in the light to be measured, intensity distribution of the x-polarized light and y-polarized light in the light after beam combination of the reference light and the light to be measured and intensity distribution of the x-polarized light and y-polarized light in the reference light; and a calculation unit configured to obtain a real part and an imaginary part of the cross spectral density of the light to be measured according to the intensity distributions, retrieve the intensity distribution of the scattering medium by using the real part and the imaginary part of the cross spectral density and calculate the intensity distribution of the scattering medium to obtain the shape and location of the object to be measured.

In an embodiment of the present invention, the system further includes a Fourier lens provided between the scattering medium and the first beam polarization splitting assembly.

In an embodiment of the present invention, the system further includes a first half-wave plate provided between the Fourier lens and the first beam polarization splitting assembly.

In an embodiment of the present invention, the first beam polarization splitting assembly includes a first beam splitting element and a first beam polarization splitting element, the first beam splitting element being provided between the first half-wave plate and the first beam polarization splitting element.

In an embodiment of the present invention, the system further includes a second beam polarization splitting assembly connected to the optical measurement assembly, the second beam polarization splitting assembly including a second beam splitting element a, a second beam splitting element b, a second beam polarization splitting element a, a second beam polarization splitting element b and a reflective element. The reference light is split by the second beam splitting element a. One reference light beam and the light beam to be measured are combined at the second beam splitting element b and the combined light is split into x-polarized light and y-polarized light by the second beam polarization splitting element a. The other reference light beam is reflected by the reflective element and split into x-polarized light and y-polarized light by the second beam polarization splitting element b.

In an embodiment of the present invention, the optical measurement assembly includes a first charge-coupled device unit, a second charge-coupled device unit and a third charge-coupled device unit arranged in an array, the first charge-coupled device unit, the second charge-coupled device unit and the third charge-coupled device unit each including at least two individual charge-coupled devices, in which the optical distance from the uppermost individual charge-coupled device in the first charge-coupled device unit to the Fourier lens is equal to the focal length of the Fourier lens.

In an embodiment of the present invention, the optical distances from all the individual charge-coupled devices in the first charge-coupled device unit and the second charge-coupled device unit to the first beam splitting element are equal to each other and equal to the optical distances from all the individual charge-coupled devices in the second charge-coupled device unit and the third charge-coupled device unit to the second beam splitting element b.

Further, the present invention also provides an optical imaging method based on random light field spatial structure engineering, including:

scattering a beam transmitted through free space via a scattering medium to obtain light to be measured, the beam carrying information on an object to be measured;

splitting and polarizing the light to be measured, in which one light beam to be measured is split into x-polarized light y-polarized light and the other light beam to be measured is combined with a reference light beam and then split into x-polarized light and y-polarized light, the reference light being light that is completely coherent with the light to be measured;

measuring intensity distribution of the x-polarized and y-polarized parts of the light to be measured, intensity distribution of the x-polarized and y-polarized parts of the light after beam combination of the reference light and the light to be measured and intensity distribution of the x-polarized and y-polarized parts of the reference light; and obtaining a real part and an imaginary part of the cross spectral density of the light to be measured according to the intensity distributions, retrieving the intensity distribution of light on the scattering medium by using the real part and the imaginary part of the cross spectral density and calculating the intensity distribution to obtain the shape and location of the object to be measured.

In an embodiment of the present invention, the obtaining a real part and an imaginary part of the cross spectral density of the light to be measured according to the intensity distributions and retrieving the intensity distribution of the scattering medium by using the real part and the imaginary part of the cross spectral density includes:

calculating the real part $W'(r_1,r_2)$ and the imaginary part $W''(r_1,r_2)$ of the cross spectral density of the light to be measured by the equations:

$$W'(r_1, r_2) = \frac{\langle I_x^C(r_1) I_x^C(r_2) \rangle_S - \langle [I_x(r_1) + I_x^R(r_1)][I_x(r_2) + I_x^R(r_2)] \rangle_S}{2\sqrt{I_x^R(r_1) I_x^R(r_2)}}$$

$$W''(r_1, r_2) = \frac{\langle I_x^C(r_1) I_y^C(r_2) \rangle_S - \langle [I_x(r_1) + I_x^R(r_1)][I_y(r_2) + I_y^R(r_2)] \rangle_S}{2\sqrt{I_x^R(r_1) I_y^R(r_2)}}$$

where $\langle \ldots \rangle_S$ represents the spatial average, r, $r_1$ and $r_2$ represent coordinates of any point in the observation plane, $I_x(r)$ and $I_y(r)$ represent the intensity distributions of x- and y-polarization of the light to be measured respectively, $I_x^R(r)$ and $I_y^R(r)$ represent the intensity distributions of x- and y-polarization of the reference light respectively, and $I_x^C(r)$ and $I_y^C(r)$ represent the intensity distributions of x- and y-polarization of the light after beam combination of the reference light and the light to be measured respectively;

retrieving the intensity distribution $p(\rho)$ of light on the scattering medium from the cross spectral density through Fourier transform by the equation $$W(r_1, r_2) = \frac{1}{\lambda^2 f^2} \int\int p(\rho) \exp\left[\frac{2i\pi}{\lambda f} \rho \cdot (r_1 - r_2)\right] d^2\rho$$

where λ represents the wavelength of the light, f represents the focal length of the Fourier lens, ρ represents the coordinate of any point in the plane where the scattering medium is positioned, and i represents the imaginary unit.

In an embodiment of the present invention, the calculating the intensity distribution to obtain the shape and location of the object to be measured includes:

calculating the intensity distribution of light on the scattering medium by using the phase retrieval algorithm in the Fresnel domain to obtain the shape and location of the object to be measured.

The technical solution of the present invention described above has the following advantages compared with prior art:

In the present invention, first the intensity distribution of the light to be measured, the intensity distribution of the combined light after beam combination of the reference light and the light to be measured and the intensity distribution of the reference light are measured; a real part and an imaginary part of the cross spectral density of the light to be measured are obtained according to the intensity distributions; the intensity distribution in the surface of the scattering medium is retrieved by using the real part and the imaginary part of the cross spectral density and the intensity distribution of the surface of the scattering medium is calculated to obtain the shape and location of the object to be measured. In this way, dynamic objects can be imaged quickly, the imaging range is not limited by the optical memory effect and the point spread function of the whole optical system does not need to be measured.

BRIEF DESCRIPTION OF THE DRAWINGS

In order to make the content of the present invention easier to be understood clearly, the present invention will be explained in further detail below according to particular embodiments of the present invention and with reference to the accompanying drawings, in which.

Figure 1:
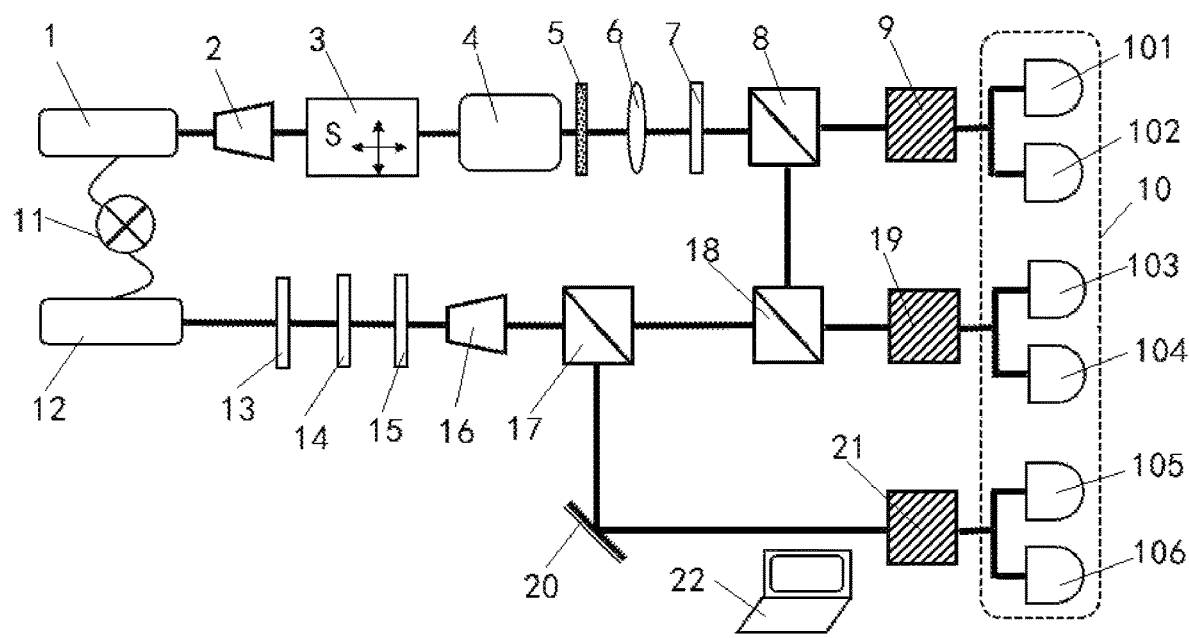
FIG. 1 is a schematic view of an optical imaging system based on random light field spatial structure engineering according to the present invention.

REFERENCE NUMERALS 1 first laser; 2 first beam expanding element; 3 object to be measured; 4 free space transmission unit; 5 scattering medium; 6 Fourier lens; 7 first half-wave plate; 8 first beam splitting element; 9 first beam polarization splitting element; 10 optical measurement assembly; 11 phase-locked loop; 12 second laser; 13 linear polarizer plate; 14 second half-wave plate; 15 quarter-wave plate; 16 second beam expanding element; 17 second beam splitting element a; 18 second beam splitting element b; 19 second beam polarization splitting element a; 20 reflective element; 21 second beam polarization splitting element b; 22 calculation unit.

DETAILED DESCRIPTION OF THE PREFERRED EMBODIMENTS

The present invention will be further explained below with reference to the accompanying drawings and particular embodiments, so that those skilled in the art can better understand and implement the invention. However, the listed embodiments should not be taken as limitation of the present invention.

First Embodiment

Referring to FIG. 1, this embodiment provides an optical imaging system based on random light field spatial structure engineering, the system includes a scattering assembly, a first beam polarization splitting assembly, an optical measurement assembly 10 and a calculation unit 22.

The scattering assembly is configured to scatter a beam transmitted through free space via a scattering medium 5 to obtain light to be measured, the beam carrying information on an object to be measured 3. The scattering medium 5 is preferably frosted glass.

The first beam polarization splitting assembly is configured to split the polarizaiton of the light to be measured, in which one light beam to be measured is split into x-polarized light and y-polarized light and the other light beam to be measured is combined with a reference light beam and then split into x-polarized light and y-polarized light, the reference light is completely coherent with the light to be measured.

The optical measurement assembly 10 is configured to measure intensity distribution of the x-polarized and y-polarized parts of the light to be measured, intensity distribution of the x-polarized and y-polarized parts of the light after beam combination of the reference light and the light to be measured and intensity distribution of the x-polarized and y-polarized parts of the reference light.

The calculation unit 22 is configured to obtain a real part and an imaginary part of the cross spectral density of the light to be measured according to the intensity distributions, retrieve the intensity distribution of the scattering medium 5 by using the real part and the imaginary part of the cross spectral density and calculate the intensity distribution of light on the scattering medium 5 to obtain the shape and location of the object to be measured 3.

In this embodiment, the system further includes a Fourier lens 6 provided between the scattering medium 5 and the first beam polarization splitting assembly. The Fourier lens 6 can perform Fourier transform on the light to be measured that has passed through the scattering medium 5, thereby increasing the coherence of the light field.

In this embodiment, the system further includes a first half-wave plate 7 provided between the Fourier lens 6 and the first beam polarization splitting assembly. The light to be measured passes through the first half-wave plate 7 to obtain light linearly polarized in the 45° polarization direction.

The first beam polarization splitting assembly includes the first beam splitting element 8 and the first beam polarization splitting element 9. The first beam splitting element 8 is provided between the first half-wave plate 7 and the first beam polarization splitting element 9. The linearly polarized light coming out of the first half-wave plate 7 is split into two beams by the first beam splitting element 8, in which the transmitted beam is split into x-polarized light and y-polarized light by the first beam polarization splitting element 9. Preferably, the first beam splitting element 8 may be a beam splitter mirror and the first beam polarization splitting element 9 may be a polarizer and beam splitter mirror.

In this embodiment, the system further includes a first laser 1, a first beam expanding element 2 and a free space transmission unit 4. The first laser 1 can emit completely coherent and linearly polarized laser, this beam carrying information on the object to be measured 3. The beam passes through the first beam expanding element 2, which may be a beam expander mirror, and becomes expanded. The expanded beam passes through the object to be measured 3, which can be moved freely up down and left right, and is transmitted by the free space transmission unit 4 to the scattering medium 5, which may be frosted glass.

In this embodiment, the system further includes a second beam polarization splitting assembly connected to the optical measurement assembly 10. The second beam polarization splitting assembly includes a second beam splitting element a17, a second beam splitting element b18, a second beam polarization splitting element a19, a second beam polarization splitting element b21 and a reflective element 20. The reference light beam is split by the second beam splitting element a17, in which one reference light beam and a light beam to be measured are combined at the second beam splitting element b18, and the combined light is split into x-polarized light and y-polarized light by the second beam polarization splitting element a19. The other reference light beam is reflected through the reflective element 20 and split into x-polarized light and y-polarized light by the second beam polarization splitting element b21. Preferably, the second beam splitting element a17 and the second beam splitting element b18 may be a beam splitter mirror, the second beam polarization splitting element a19 and the second beam polarization splitting element b21 may be a polarizer and beam splitter mirror, and the reflective element 20 may be a reflective mirror.

The optical measurement assembly 10 includes a first charge-coupled device unit, a second charge-coupled device unit and a third charge-coupled device unit arranged in an array. The first charge-coupled device unit is configured to measure the intensity distribution of the x-polarized light and y-polarized light of the light to be measured. The second charge-coupled device unit is configured to measure the intensity distribution of the x-polarized light and y-polarized light of the light after beam combination of the reference light and light to be measured. The third charge-coupled device unit is configured to measure the intensity distribution of the x-polarized light and y-polarized light of the reference light.

Further, the first charge-coupled device unit, the second charge-coupled device unit and the third charge-coupled device unit each include at least two individual charge-coupled devices. Preferably, each charge-coupled device unit includes two individual charge-coupled devices, so that the three charge-coupled device units have six individual charge-coupled devices in total, i.e., the individual charge-coupled device 101, the individual charge-coupled device 102, the individual charge-coupled device 103, the individual charge-coupled device 104, the individual charge-coupled device 105 and the individual charge-coupled device 106 in sequence from top to down. The optical distance from the individual charge-coupled device 101 to the Fourier lens 6 is equal to the focal length of the Fourier lens 6.

Further, the optical distances from the individual charge-coupled device 101, the individual charge-coupled device 102, the individual charge-coupled device 103 and the individual the charge-coupled device 104 to the first beam splitting element 8 are equal to each other and equal to the optical distances from the individual charge-coupled device 103, the individual charge-coupled device 104, the individual charge-coupled device 105 and the individual charge-coupled device 106 to the second beam splitting element b18.

In this embodiment, the system further includes a second laser 12, a phase-locked loop 11, a linear polarizer plate 13, a second half-wave plate 14, a quarter-wave plate 15 and a second beam expanding element 16. The second laser 12 is connected to the first laser 1 through the phase-locked loop 11. That is, linearly polarized light that is completely coherent with the laser emitted by the first laser 1 is obtained through the phase-locked loop 11, the second laser 12 of the same type as the first laser 1 and the linear polarizer plate 13. This linearly polarized light is used as the reference light to measure the coherent structure of the light field. The reference light passes through the second half-wave plate 14 to obtain light linearly polarized in 45° polarization direction, which then passes through the quarter-wave plate 15 with a fast axis or slow axis at 0° to obtain circularly polarized light, which then passes through the second beam expanding element 16 (which may be a beam expander mirror) and becomes expanded.

The operation principle of an optical imaging system based on random light field spatial structure engineering according to this embodiment will be explained hereinafter.

With continued reference to FIG. 1, the operation principle of an optical imaging system based on random light field spatial structure engineering according to this embodiment is as follows. The first laser 1 may be a helium-neon laser that emits completely coherent and linearly polarized laser with a wavelength of 633 nm. The beam carries information on the object to be measured and passes through the first beam expanding element 2 and becomes expanded. The expanded beam passes through the object to be measured 3, which can move freely up down and lift right, and is transmitted by the free space transmission unit 4 to the scattering medium 5, which may be frosted glass, to obtain the light to be measured. When the beam passes through the free space transmission unit 4, the light intensity image becomes blurred under the effect of diffraction. The beam continues to be transmitted and impinges on the rotated scattering medium 5. Under the effect of scattering of the scattering medium 5, the light to be measured loses phase information. If the information of the image needs to be retrieved, the coherent structure of the back light field of the scattering medium 5 can be measured to retrieve the intensity distribution information of the back surface of the scattering medium 5 and consequently obtain the shape and location of the object to be measured 3 by using the phase retrieval algorithm in the Fresnel domain. To allow simple and more accurate measurement, a Fourier lens 6 can be added after the scattering medium 5 to perform Fourier transform on the light to be measured that has passed through the scattering medium 5, thereby increasing the coherence of the light field. To facilitate measurement of the coherent structure of the light field, the light to be measured passes through the first half-wave plate 7 to obtain light linearly polarized in 45° polarization direction. The linearly polarized light beam is split into two beams through the first beam splitting element 8. The transmitted light beam to be measured is split into x-polarized light and y-polarized light through the first beam polarization splitting element 9. The individual charge-coupled device a and the individual charge-coupled device b of the optical measurement assembly 10 measure the intensity distribution of the x-polarized light and y-polarized light of the light to be measured respectively.

In another aspect, linearly polarized light that is completely coherent with the laser emitted by the first laser 1 is obtained through the phase-locked loop 11, the second laser 12 of the same type as the first laser 1 and the linear polarizer plate 13. This linearly polarized light is used as the reference light to measure the coherent structure of the light field. The reference light passes through the second half-wave plate 14 to obtain light linearly polarized in 45° polarization direction, which then passes through the quarter-wave plate 15 with a fast axis or slow axis at 0° to obtain circularly polarized light, which then passes through the second beam expanding element 16 and becomes expanded. Then the reference light is split into two beams by the second beam splitting element a17. The transmitted reference light and the light to be measured are combined at the second beam splitting element b18. The combined light is split into x-polarized light and y-polarized light by the second beam polarization splitting element a19. The individual charge-coupled device c and individual charge-coupled device d of the optical measurement assembly 10 measure the intensity distribution of the x-polarized light and y-polarized light of the combined light respectively. The reference light reflected by the second beam splitting element a17 is reflected through the reflective element 20. Thereafter, the reference light is split by the second beam polarization splitting element b21 into x-polarized light and y-polarized light. The individual charge-coupled device e and individual charge-coupled device f of the optical measurement assembly 10 measure the intensity distribution of the x-polarized light and y-polarized light of the reference light respectively.

In the end, the intensity distribution information thus obtained is sent to a calculation unit 22 and computed and processed by the calculation unit 22.

Second Embodiment

The optical imaging method based on random light field spatial structure engineering according to a second embodiment of the present invention will be explained hereinafter. The optical imaging method based on random light field spatial structure engineering described below corresponds to the optical imaging system based on random light field spatial structure engineering described above.

Figure 2:
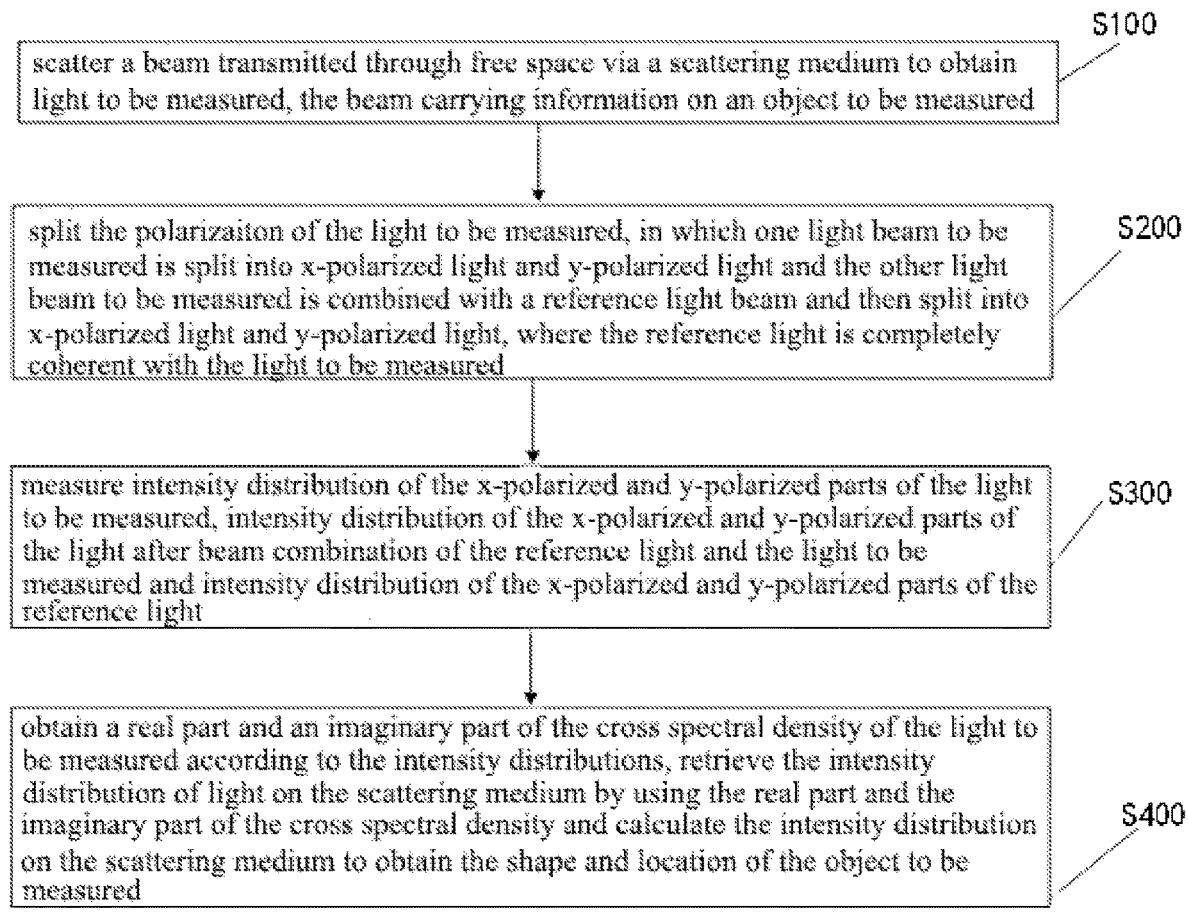
FIG. 2 is a flow chart of an optical imaging method based on random light field spatial structure engineering according to the present invention.

Referring to FIG. 2, this embodiment provides an optical imaging method based on random light field spatial structure engineering, including the follow steps.

S100: scattering a beam transmitted through free space via a scattering medium 5 to obtain light to be measured, the beam carrying information on an object to be measured.

As an example, under the effect of scattering of the scattering medium 5, the beam transmitted through free space and carrying information on the object to be measured 3 loses phase information. If the information of the image needs to be retrieved, the coherence structure of the back light field of the scattering medium 5 can be measured and the intensity distribution information of the back surface of the scattering medium 5 is retrieved to obtain the shape and location of the object to be measured 3 by using the phase retrieval algorithm. To allow simple and more accurate measurement, a Fourier lens 6 can be added after the scattering medium 5 and used to perform Fourier transform on the light to be measured that has passed through the scattering medium 5, thereby increasing the coherence of the light field.

S200: splitting the polarization of the light to be measured, in which one light beam to be measured is split into x-polarized light y-polarized light and the other light beam to be measured is combined with a reference light beam and then split into x-polarized light and y-polarized light, where the reference light is completely coherent with the light to be measured.

As an example, linearly polarized light that is completely coherent with the laser emitted by the first laser 1 is obtained through the phase-locked loop 11, the second laser 12 of the same type as the first laser 1 and the linear polarizer plate 13. This linearly polarized light is used as the reference light to measure the coherence structure of the light field.

S300: measuring intensity distribution of the x-polarized and y-polarized parts of the light to be measured, intensity distribution of the x-polarized and y-polarized parts of the light after beam combination of the reference light and the light to be measured and intensity distribution of the x-polarized and y-polarized parts of the reference light.

As an example, the individual charge-coupled device a and individual charge-coupled device b of the optical measurement assembly 10 measure the speckle information of the x-polarized and the y-polarized parts of the light to be measured respectively. Said speckle information here is the intensity distribution.

S400: obtaining a real part and an imaginary part of the cross spectral density of the light to be measured according to the intensity distributions, retrieving the intensity distribution of light on the scattering medium 5 by using the real part and the imaginary part of the cross spectral density and calculating the intensity distribution of light on the scattering medium 5 to obtain the shape and location of the object to be measured 3.

As an example, the intensity distribution of light on the scattering medium 5 can be calculated by using the retrieval algorithm in the Fresnel domain to obtain the shape and location of the object to be measured 3.

The operation principles of the optical imaging method based on random light field spatial structure engineering according to this embodiment will be explained hereinafter. The operation principles thereof are as follows.

Principle I: Generation of Random Light Field

During transmission of the beam carrying information on the object to be measured 3 through the free space transmission unit, the intensity image has become blurred due to interference effect. That is, the light field of the front surface of the scattering medium 5 can be expressed as:

$$E(\rho) = \frac{1}{i\lambda z}\exp(ikz)\int\int O(v)\exp\left[\frac{ik}{2z}(\rho-v)^2\right]d^2v \quad (1)$$

where i represents the imaginary unit, O(v) represents light field distribution of the object to be measured 3, λ and k represent the wavelength and wavenumber of light respectively, z represents the transmission distance, i.e. the distance between the object to be measured 3 and the scattering medium 5, and v and ρ represent the coordinates of the cross sections in which the object to be measured 3 and the scattering medium 5 are situated respectively.

Due the scattering effect of the scattering medium 5, the light field lost phase information, the light field being expressed as $$E'(\rho)=\exp(i\varphi_\rho)E(\rho) \quad (2)$$

where E'(ρ) represents the light field distribution of the back surface of the scattering medium 5, and $\varphi_\rho$ represents the random phase which is related to the coordinate ρ.

The light intensity at the surface of the scattering medium 5 is expressed as:

$$p(\rho)=E^*(\rho)E(\rho)=E^{*'}(\rho)E'(\rho) \quad (3)$$

The equation above shows that the front and back surfaces of the scattering medium 5 have the same intensity distribution.

The light field of the back surface of the scattering medium 5 can be characterized by its second order statistics cross spectral density:

$$W(\rho_1,\rho_2)=\sqrt{p(\rho_1)p(\rho_2)}\delta(\rho_1-\rho_2) \quad (4)$$

where $\delta(\ldots)$ represents the Dirac $\delta$ function, and $\rho_1$ and $\rho_2$ represent the coordinates of the plane where the scattering medium 5 is situated.

To allow simple and more accurate measurement, a Fourier lens 6 can be added behind the scattering medium 5 and used to perform Fourier transform on the light field of the rear surface of the scattering medium 5, thereby increasing the coherence of the light field. The light field passes through the Fourier lens 6 and becomes a partially coherent beam having cross spectral density of:

$$W(r_1, r_2) = \frac{1}{\lambda^2 f^2} \int\int W(\rho_1, \rho_2)\exp\left[\frac{2i\pi}{\lambda f}(\rho_1 \cdot r_1 - \rho_2 \cdot r_2)\right]d\rho_1 d\rho_2 \quad (5)$$

where r, $r_1$ and $r_2$ represent the coordinates of any point in the observation plane and f represents the focal length of the Fourier lens 6.

By substituting the equation (4) into the equation (5), the following relation can be established between the intensity distribution of the surface of the scattering medium 5 and the spatially coherent structure of the observation plane:

$$W(r_1, r_2) = \frac{1}{\lambda^2 f^2} \int\int p(\rho)\exp\left[\frac{2i\pi}{\lambda f}\rho \cdot (r_1 - r_2)\right]d^2\rho \quad (6)$$

Principle II: Measurement of the Spatial Coherence Structure of the Random Light Field The second order statistics characteristics, including the coherence, of the light to be measured can be expressed by the cross spectral density as:

$$W(r_1,r_2)=\langle E^*(r_1)E(r_2)\rangle \quad (7)$$

where E(r) represents the random electric field at the point r in space, the superscript asterisk represents the complex conjugation, and the angle brackets represent the ensemble average.

Specifically, by introducing a reference light beam $E^R(r)$ and combining it with a light beam to be measured E(r), theoretically two reference light beams with a phase difference of $\Delta\phi$ can be obtained by rotating the quarter-wave plate. The resultant two reference light paths are coherently combined with the light beam to be measured respectively, and the total random electric fields after beam combination are respectively:

$$E^{C1}(r)=E(r)+E^{R1}(r) \quad (8)$$

$$E^{C2}(r)=E(r)+E^{R2}(r) \quad (9)$$

where $E^{R1}(r)$ and $E^{R2}(r)$ represent the electric fields of the two reference light beams.

Then the light intensity of the combined light is:

$$I^{Cv}E^{Cv}(r)E^{Cv*}(r) \quad (10)$$

where $\upsilon$ has a value of 1 or 2 and $I^{Cv}(r)$ represents the light intensity of the $\upsilon$-th combined light.

The light intensities of the light beams from the two beam combinations are cross-related as:

$$G^C(r_1,r_2)=\langle I^{C1}(r_1)I^{C2}(r_2)\rangle \quad (11)$$

By substituting the equations (8)-(10) into the equation (11), the cross relation between the light intensities of the resultant fields can be expressed as:

$$G^C(r_1,r_2)=\langle I^{U1}(r_1)\rangle\langle I^{U2}(r_2)\rangle+|W(r_1,r_2)|^2+2\sqrt{\langle I^{R1}(r_1)\rangle\langle I^{R2}(r_2)\rangle}\times[W(r_1,r_2)\cos\Delta\phi-W''(r_1,r_2)\sin\Delta\phi] \quad (12)$$

where $I^{R1}(r)=|E^{R1}(r)|^2$ and $I^{R2}(r)=|E^{R2}(r)|^2$ represent the intensity distributions of two reference light beams respectively, and $I^{U1}(r)=I^{R1}(r)+I(r)$ and $I^{U2}(r)=I^{R2}(r)+I(r)$ represent the non-coherent superposition of light intensity of the two reference light beams with the light to be measured respectively.

It can be found in the equation above that the light intensity cross relation $G^C(r_1,r_2)$ is related to the phase difference $\Delta\phi$ between the reference light paths and $\Delta\phi=\arg[E^{R2}(r)-E^{R1}(r)]$, and the amplitude and phase information of the cross spectral density of the light to be measured are also included in $G^C(r_1,r_2)$. For example, when $\Delta\phi=0$, the last term in the equation includes the information of real part of the cross spectral density; and when $$\Delta\phi = \frac{\pi}{2},$$

the last term in the equation includes the information of imaginary part in the cross spectral density.

That is, the phase difference between the two reference light paths can be controlled to obtain the information of real part and imaginary part of the cross spectral density and consequently obtain the amplitude and phase of the cross spectral density of the light to be measured.

Also, as can be seen from the equation (12), the light intensity cross relation function includes a background term. To remove the background term, the light intensity cross relation of non-coherent superposition between the reference light and the light to be measured is introduced:

$$G^U(r_1, r_2) = \langle I^{U1}(r_1)I^{U2}(r_2)\rangle \quad (13)$$
$$= \langle I^{U1}(r_1)\rangle\langle I^{U2}(r_2)\rangle + |W(r_1, r_2)|^2$$

By subtracting the equation (13) from the equation (12), we get:

$$\Delta G(r_1, r_2, \Delta\phi) = G^C(r_1, r_2) - G^U(r_1, r_2) \quad (14)$$
$$= 2\sqrt{\langle I^{R1}(r_1)\rangle\langle I^{R2}(r_2)\rangle}\operatorname{Re}\left[e^{i\Delta\phi}W(r_1, r_2)\right].$$

In the equation (14), the distribution of $\Delta\phi$ is valued to 0 and $$\frac{\pi}{2},$$

and we get the real part and the imaginary part of the cross spectral density as:

$$W'(r_1, r_2) = \frac{\Delta G(r_1, r_2, \Delta\phi = 0)}{2\sqrt{\langle I^{R1}(r_1)\rangle\langle I^{R2}(r_2)\rangle}} \quad (15)$$

$$W''(r_1, r_2) = \frac{\Delta G\left(r_1, r_2, \Delta\phi = \frac{\pi}{2}\right)}{2\sqrt{\langle I^{R1}(r_1)\rangle\langle I^{R2}(r_2)\rangle}}. \quad (16)$$

In this embodiment, to measure the cross spectral density of the light to be measured, we use a polarizer and beam splitter mirror and an individual charge-coupled device to record the intensity distributions $I_x(r)$ and $I_y(r)$ of the x- and y-polarization in the π/4 linearly polarized partial light to be measured and also the intensity distribution $I_x^R(r)$ and $I_y^R(r)$ of the x- and y-polarization of the circularly polarized reference light, and also the intensity distribution $I_x^C(r)$ and $I_y^C(r)$ of x- and y-polarization in the combined light after beam combination of the reference light and the light to be measured. From the quantities above, the real part and the imaginary part of the cross spectral density can be retrieved as:

$$W'(r_1, r_2) = \frac{\langle I_x^C(r_1)I_x^C(r_2)\rangle_S - \langle [I_x(r_1) + I_x^R(r_1)][I_x(r_2) + I_x^R(r_2)]\rangle_S}{2\sqrt{I_x^R(r_1)I_x^R(r_2)}} \quad (17)$$

$$W''(r_1, r_2) = \frac{\langle I_x^C(r_1)I_y^C(r_2)\rangle_S - \langle [I_x(r_1) + I_x^R(r_1)][I_y(r_2) + I_y^R(r_2)]\rangle_S}{2\sqrt{I_x^R(r_1)I_y^R(r_2)}} \quad (18)$$

where $\langle \ldots \rangle_S$ represents the spatial average. As this light field is produced by the Fourier system, the ensemble average can be replaced by spatial average instead of temporal average. According to the equation (6), the intensity distribution p(ρ) of the surface of the scattering medium 5 can be retrieved by use of the measured cross spectral density through Fourier transform.

Principle III: Retrieving the Shape and Location of the Object to be Measured 3 by Using the Phase Retrieval Algorithm in the Fresnel Domain The intensity distribution p(ρ) of the surface of the scattering medium 5 is known from the equation above. If the specific distribution of the function of the object to be measured 3 is further to be obtained, the object to be measured 3 can be recovered by the phase retrieval algorithm, specifically in the following steps:

10: first assuming the initial object to be measured as:

$$O_k(v) = \sqrt{p(\rho)} \quad (19);$$

20: transmitting the initial object to be measured through free space over a distance of z, whereupon it has a light field of:

$$E_k(\rho) = \frac{1}{i\lambda z}\exp(ikz)\int\int O_k(v)\exp\left[\frac{ik}{2z}(\rho-v)^2\right]d^2v \quad (20)$$

where λ and k represent the wavelength and wavenumber of light respectively, z represents the transmission distance, i.e. the distance between the initial object to be measured and the scattering medium 5, and v and ρ represent the coordinates of the cross sections in which the object to be measured and the scattering medium 5 are situated respectively;

30: obtaining the phase of $E_k(\rho)$ as:

$$\theta_k(\rho) = \arg[E_k(\rho)] \quad (21),$$

40: assigning the phase to $\sqrt{p(\rho)}$ to obtain the new light field of the surface of the scattering medium:

$$E'_k(\rho) = \sqrt{I(\rho)}\exp[i\theta_k(\rho)] \quad (22);$$

50: transmitting $E'_k(\rho)$ in free space over a distance of −z and taking the real part of the resultant light field to obtain $O'_k(v)$; and 60: screening $O'_k(v)$ for effective information based on constraints:

$$O_{k+1}(v) = \begin{cases} O'_k(v) & [O'_k(v) > 0] \\ 0 & [O'_k(v) < 0] \end{cases}. \quad (23)$$

So far, we have obtained the function $O_{k+1}(v)$ of the new object to be measured. Loop iteration is needed in order to obtain more accurate information. That is, these six steps are repeated in 30 to 80 loops. The real part of the function $O_{k+1}(v)$ of the new object to be measured that is finally obtained is squared to obtain the intensity distribution of the initial object to be measured, thereby accomplishing imaging of the object to be measured 3 hidden behind the scattering medium through the scattering medium.

To sum up, in the present invention, first the intensity distribution of the light to be measured, the intensity distribution of the combined light after beam combination of the reference light and the light to be measured and the intensity distribution of the reference light are measured; a real part and an imaginary part of the cross spectral density of the light to be measured are obtained according to the intensity distributions; the intensity distribution in the surface of the scattering medium 5 is retrieved by using the real part and the imaginary part of the cross spectral density and the intensity distribution of light on the surface of the scattering medium 5 is calculated to obtain the shape and location of the object to be measured 3. In this way, dynamic objects can be imaged quickly, the imaging range is not limited by the optical memory effect and the point spread function of the whole optical system does not need to be measured.

It should be understood by those skilled in the art that the embodiments of this application can be provided as methods, systems, or computer program products. Therefore, this application can take the form of an entirely hardware embodiment, an entirely software embodiment, or an embodiment combining software and hardware aspects. Furthermore, this application may take the form of a computer program product implemented on one or more computer usable storage media (including but not limited to disk storage, CD-ROM, optical storage, etc.) having computer usable program codes contained therein.

This application is described with reference to flowcharts and/or block diagrams of methods, devices (systems), and computer program products according to embodiments of this application. It should be understood that each flow and/or block in flowchart and/or block diagram, and combinations of flows and/or blocks in flowchart and/or block diagram can be implemented by computer program instructions. These computer program instructions may be provided to the processor of a general-purpose computer, a special-purpose computer, an embedded processor or other programmable data processing device to produce a machine, so that the instructions executed by the processor of the computer or other programmable data processing device produce means for implementing the functions specified in one or more flows in a flowchart and/or one or more blocks in a block diagram.

These computer program instructions may also be stored in a computer-readable memory that can direct a computer or other programmable data processing device to operate in a specific way, so that the instructions stored in the computer-readable memory produce an article of manufacture including instruction means that implement the functions specified in one or more flows in a flowchart and/or one or more blocks in a block diagram.

These computer program instructions may also be loaded on a computer or other programmable data processing device, so that a series of operation steps are performed on the computer or other programmable device to produce a computer-implemented process, so that the instructions executed on the computer or other programmable device provide steps for implementing the functions specified in one or more flows in a flowchart and/or one or more blocks in a block diagram.

Obviously, the above-mentioned embodiments are only examples listed for clear explanation, and not limitations on the implementation. For those of ordinary skill in the art, other changes or variations can be made on the basis of the above description. It is not necessary and impossible to exhaust all the implementations here. And the obvious changes or variations derived from this shall fall within the scope of protection of the present invention.

What is claimed is:

1. An optical imaging system based on random light field spatial structure engineering, comprising:
   a scattering assembly configured to scatter a beam transmitted through free space via a scattering medium to obtain light to be measured, the beam carrying information on an object to be measured;
   a first beam polarization splitting assembly configured to split the polarization of the light to be measured, in which one light beam to be measured is split into x-polarized light and y-polarized light and the other light beam to be measured is combined with a reference light beam and then split into x-polarized light and y-polarized light, where the reference light is completely coherent with the light to be measured;
   an optical measurement assembly configured to measure intensity distribution of the x-polarized and y-polarized parts of the light to be measured, intensity distribution of the x-polarized and y-polarized parts of the light after beam combination of the reference light and the light to be measured and intensity distribution of x-polarized and y-polarized parts of the reference light which has not been combined with the other light beam to be measured; and
   a calculation unit configured to obtain a real part and an imaginary part of the cross spectral density of the light to be measured according to the intensity distributions, retrieve the intensity distribution of light on the scattering medium by using the real part and the imaginary part of the cross spectral density and calculate the intensity distribution on the scattering medium to obtain the shape and location of the object to be measured.

2. The optical imaging system based on random light field spatial structure engineering of claim 1, further comprising a Fourier lens provided between the scattering medium and the first beam polarization splitting assembly.

3. The optical imaging system based on random light field spatial structure engineering of claim 2, further comprising a first half-wave plate provided between the Fourier lens and the first beam polarization splitting assembly.

4. The optical imaging system based on random light field spatial structure engineering of claim 3, wherein the first beam polarization splitting assembly comprises a first beam splitting element and a first beam polarization splitting element, the first beam splitting element being provided between the first half-wave plate and the first beam polarization splitting element.

5. The optical imaging system based on random light field spatial structure engineering of claim 2, wherein the optical measurement assembly comprises a first charge-coupled device unit, a second charge-coupled device unit and a third charge-coupled device unit arranged in an array, the first charge-coupled device unit, the second charge-coupled device unit and the third charge-coupled device unit each comprising at least two individual charge-coupled devices, in which the optical distance from the uppermost individual charge-coupled device in the first charge-coupled device unit to the Fourier lens is equal to the focal length of the Fourier lens.

6. The optical imaging system based on random light field spatial structure engineering of claim 5, wherein the optical distances from all the individual charge-coupled devices in the first charge-coupled device unit and the second charge-coupled device unit to a first beam splitting element of the first beam polarization splitting assembly are equal to each other and equal to the optical distances from all the individual charge-coupled devices in the second charge-coupled device unit and the third charge-coupled device unit to a third beam splitting element of a second beam polarization splitting assembly.

7. The optical imaging system based on random light field spatial structure engineering of claim 1, further comprising a second beam polarization splitting assembly connected to the optical measurement assembly, the second beam polarization splitting assembly comprising a second beam splitting element, a third beam splitting element, a second beam polarization splitting element, a third beam polarization splitting element and a reflective element, the reference light being split by the second beam splitting element, in which one reference light beam and the light beam to be measured are combined at the third beam splitting element and the combined light is split into x-polarized light and y-polarized light by the second beam polarization splitting element, and the other reference light beam is reflected by the reflective element and split into x-polarized light and y-polarized light by the third beam polarization splitting element.

8. An optical imaging method based on random light field spatial structure engineering, comprising:
   scattering a beam transmitted through free space via a scattering medium to obtain light to be measured, the beam carrying information on an object to be measured;
   splitting and polarizing the light to be measured, in which one light beam to be measured is split into x-polarized light y-polarized light and the other light beam to be measured is combined with a reference light beam and then split into x-polarized light and y-polarized light, the reference light being light that is completely coherent with the light to be measured;
   measuring intensity distribution of the x-polarized and y-polarized parts of the light to be measured, intensity distribution of the x-polarized and y-polarized parts of the light after beam combination of the reference light and the light to be measured and intensity distribution of x-polarized and y-polarized parts of the reference light which has not been combined with the other light beam to be measured obtaining a real part and an imaginary part of the cross spectral density of the light to be measured according to the intensity distributions, retrieving the intensity distribution of light on the scattering medium by using the real part and the imaginary part of the cross spectral density and calculating the intensity distribution to obtain the shape and location of the object to be measured.

9. The optical imaging method based on random light field spatial structure engineering of claim 8, wherein the obtaining a real part and an imaginary part of the cross spectral density $W(r_1, r_2)$ of the light to be measured according to the intensity distributions and retrieving the intensity distribution of the scattering medium by using the real part and the imaginary part of the cross spectral density comprises:

calculating the real part $W'(r_1, r_2)$ and the imaginary part $W''(r_1, r_2)$ of the cross spectral density of the light to be measured by the equations:

$$W'(r_1, r_2) = \frac{\langle I_x^C(r_1) I_x^C(r_2) \rangle_S - \langle [I_x(r_1) + I_x^R(r_1)][I_x(r_2) + I_x^R(r_2)] \rangle_S}{2\sqrt{I_x^R(r_1) I_x^R(r_2)}},$$

$$W''(r_1, r_2) = \frac{\langle I_x^C(r_1) I_y^C(r_2) \rangle_S - \langle [I_x(r_1) + I_x^R(r_1)][I_y(r_2) + I_y^R(r_2)] \rangle_S}{2\sqrt{I_x^R(r_1) I_y^R(r_2)}},$$

where $\langle \ldots \rangle_s$ represents the spatial average, r, $r_1$ and $r_2$ represent coordinates of any point in an observation plane, $I_x$ (r) and $I_y$ (r) represent the intensity distributions of x-and y-polarization of the light to be measured respectively, ively, $I_x^R$ (r) and $I_y^R$ (r) represent the intensity distributions of x-and y-polarization of the reference light respectively, and $I_x^Y$ (r) and $I_y^C$ (r) represent the intensity distributions of x-and y-polarization of the light after beam combination of the reference light and the light to be measured respectively; and retrieving the intensity distribution p (ρ) of light on the scattering medium from the cross spectral density through Fourier transform by the equation $$W(r_1, r_2) = \frac{1}{\lambda^2 f^2} \int\int p(\rho) \exp\left[\frac{2i\pi}{\lambda f} \rho \cdot (r_1 - r_2)\right] d^2\rho,$$

where λ represents the wavelength of the light, $f$ represents the focal length of a Fourier lens provided proximal to the scattering medium, ρ represents the coordinate of any point in the plane where the scattering medium is positioned, and i represents the imaginary unit.

10. The optical imaging method based on random light field spatial structure engineering of claim 8, wherein the calculating the intensity distribution to obtain the shape and location of the object to be measured comprises:

calculating the intensity distribution of light on the scattering medium by using the phase retrieval algorithm in the Fresnel domain to obtain the shape and location of the object to be measured.

* * * * *